Figure 1:
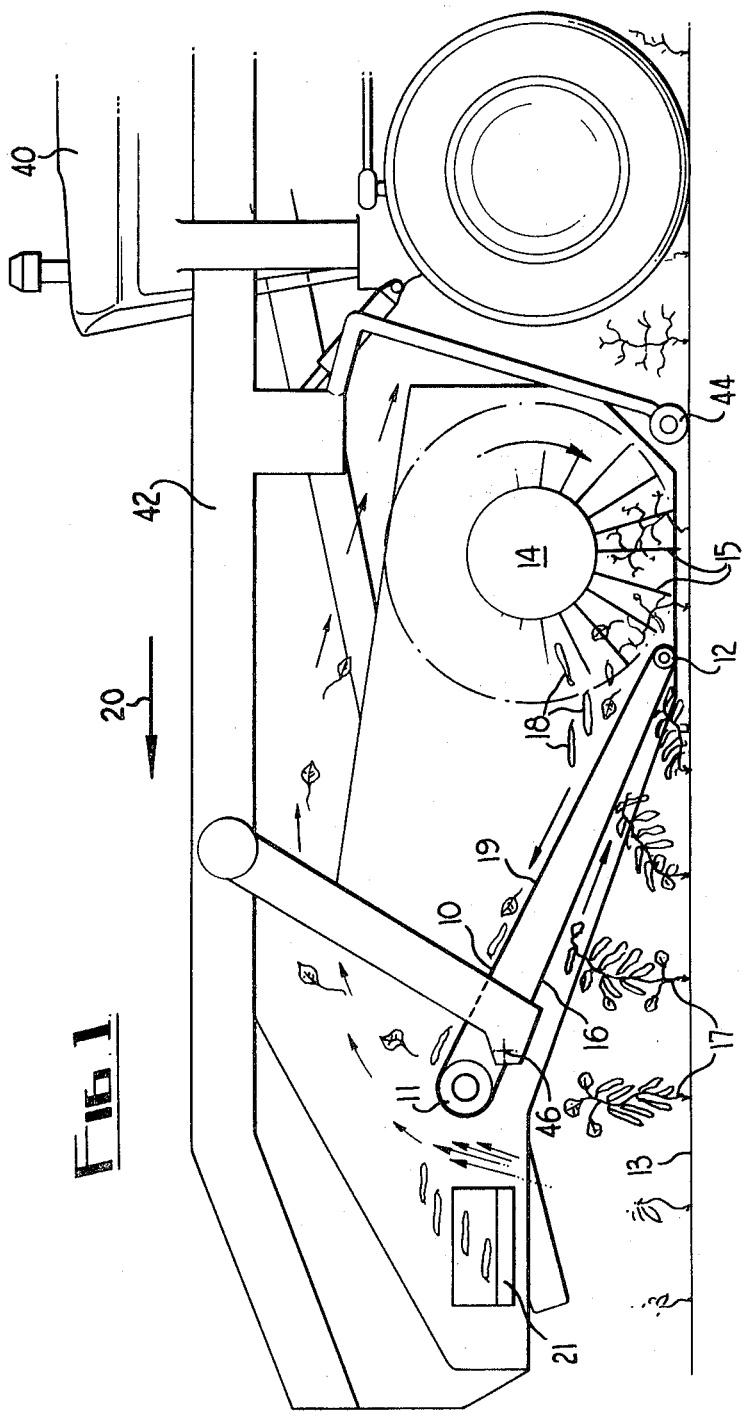

United States Patent
Redford et al.

[15] 3,651,625
[45] Mar. 28, 1972

[54] HARVESTER

[72] Inventors: George Redford, 94 Church St. West; Alan Redford, 102 Ringley Road, Outwood, both of Radcliffe, Lancashire, England

[22] Filed: May 11, 1970

[21] Appl. No.: 36,092

[30] Foreign Application Priority Data

May 10, 1969 Great Britain......................23,914/69

[52] U.S. Cl. ...................................................56/128
[51] Int. Cl. .....................................................A01d 45/22
[58] Field of Search ......................56/10.6, 10.7, 12.8, 13.3, 56/13.5, 14.1, 14.2, 16.4, 16.5, 16.6, 128

[56] References Cited

UNITED STATES PATENTS

| | | |
|---|---|---|
| 709,036 | 9/1902 | Pence....................................56/128 |
| 531,085 | 12/1894 | Anderson..............................56/128 |
| 1,683,183 | 9/1928 | Herr......................................56/128 |
| 3,408,797 | 11/1968 | Currence..............................56/13.5 |
| 2,639,573 | 5/1953 | McLaughlin..........................56/128 |

*Primary Examiner*—Antonio F. Guida
*Attorney*—Beveridge & DeGrandi

[57] ABSTRACT

A harvester for beans and like vegetables which grow on the stems of leguminous plants which comprises a frame fixable to the front of a tractor. An endless moving belt is pivotably mounted on the frame and inclined to the ground so that the lower run of the belt is directed downwardly and rearwardly. A drum having tines is mounted rearwardly of the belt about a horizontal axis transverse to the direction of movement of the belt. The belt deflects the plants rearwardly towards the drum which on rotation strips the beans from the plants and transfers them to the upper run of the belt for subsequent collection.

8 Claims, 2 Drawing Figures

HARVESTER

This invention concerns a harvester particularly for beans, peas and like vegetables which grow on the stems of leguminous plants.

It has previously been proposed to provide a bean harvester which is coupled to a tractor and which is adapted to remove beans from a plant by means movable transversely to the direction of movement of the tractor.

New drilling techniques in which the beans are sown in a diamond pattern instead of rows makes harvesting with the previously proposed harvester a difficult and time-consuming operation.

The present invention has been developed from a consideration of the above-mentioned disadvantages.

According to the present invention there is provided a harvester for beans, peas and like vegetables which grow on the stems of leguminous plants which harvester is progressible and comprises means for deflecting the stem of said plants such that they lay against the direction of progression of said harvester, means for separating the vegetables from the plant stems after the deflection thereof and means for transporting said vegetables to a collection site therefor.

In a preferred embodiment a continuous belt or conveyor device is provided, disposed at an angle to the ground and driven in a manner such that the lower run thereof travels against the direction of progression of the harvester and deflects the plant stems towards the separation means located rearward of the device. In such an embodiment the separating means may, in addition to separating the vegetables from the stems, project the separated vegetables onto the upper run of the continuous belt or conveyor device for transportation thereby to a collection site in the vicinity of that end of the upper run remote from the separation means.

Figure 2:
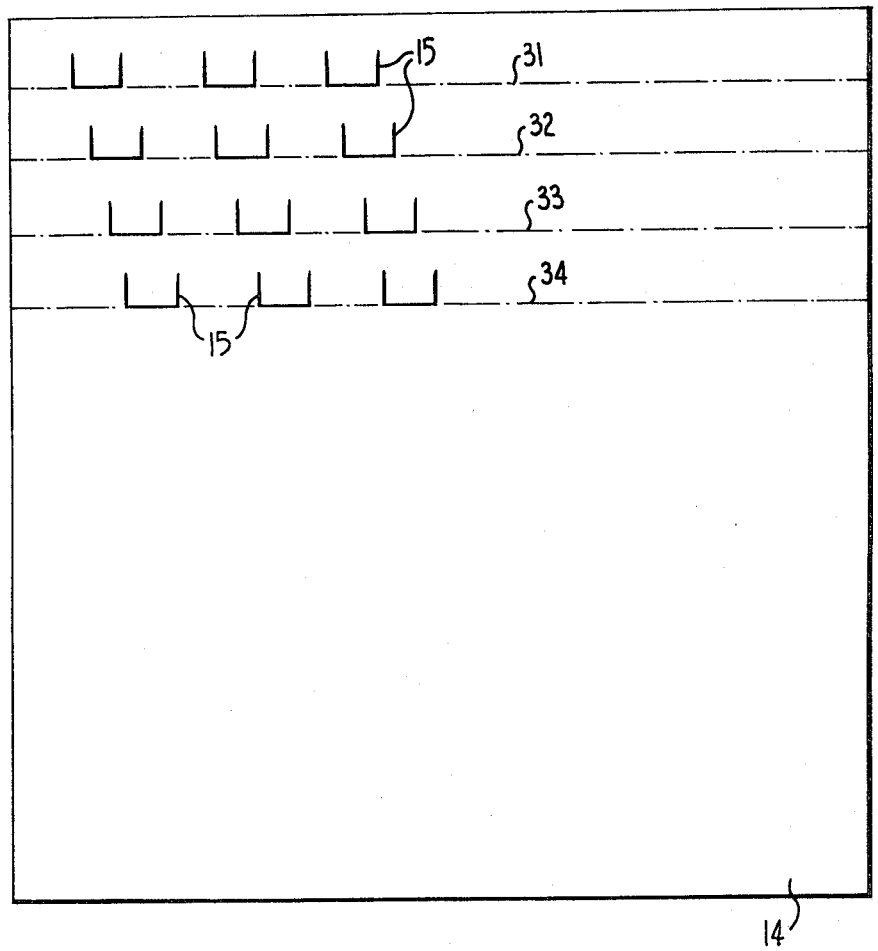

A specific embodiment of the invention will now be described by way of example with reference to the accompanying drawings in which:

FIG. 1 shows the bean harvester in side elevation; and
FIG. 2 is a developed view of a part of the drum.

Referring now to FIG. 1 of the drawings which is a schematic representation of the harvester, there is shown a conveyor belt 10 mounted on two end rollers 11 and 12 and driven by roller 11. The belt 10 is angularly disposed with respect to the ground 13. Roller 12 has a smaller diameter than roller 11 so that the belt adopts a wedge shaped configuration. If desired slats may be provided on the belt which assist the conveyance of harvested beans from roller 12 to roller 11 along upper run 19 and also assist the deflection of bean plants as the belt moves from roller 11 to roller 12 along lower run 16.

A rotatable drum 14 is located adjacent that end of the conveyor belt 10 which is lowermost and is provided with sets of tines 15 which extend radially from the periphery thereof. The axial length of the drum is of the order of the distance over five rows of beans with 18 inches between each row. The tines are disposed on the drum in such an arrangement that there is only a minimum gap or no gap at all in the paths swept out by the tines as the drum rotates. In order to achieve this the tines may be arranged randomly or, as shown in FIG. 2, in a predetermined array. Referring to FIG. 2 the tines are arranged in a plurality of rows numbered 31, 32, 33, etc. The tines in row 32 are slightly offset with respect to the tines in row 31, the tines in row 33 are offset with respect to the tines in row 32 and so on so that the gaps A between the tines in row 31 are, on rotation of the drum, swept by the tines in the subsequent or preceding rows.

The drum is located as close to the ground as possible and the distance between the drum and the end of the belt passing over roller 12 is kept to a minimum.

As shown in FIG. 1 the harvester is fixed to the front of a tractor 40 by means of a frame 42. In order to maintain the harvester the desired distance from the ground a sensing means 44 such as a wheel is provided which follows the contours of the ground and the harvester is pivotably mounted to the frame at 46.

In operation, the harvester is progressed in direction 20 and the conveyor belt 10, rollers 11 and 12, and the drum 14 are driven in the respective directions indicated. As the harvester is progressed, the lower run 16 of the belt 10 deflects the bean plants 17 such that they lie against the direction in which the harvester travels. The belt speed is faster than the ground speed of the harvester, generally by about 1.8 to 2 times and such that the resultant direction of motion of the belt is inclined to the horizontal by from 30° to 40°. The deflected plants 17 are then subjected to the flailing action of the tines 15 mounted on the drum 14 which rotates at about 240 r.p.m. The flailing action of the tines strips the beans 18 and leaves from the plants in a predominantly top to root direction and the beans are thrown by the tines onto the upper run 19 of the conveyor belt 10 by which they are carried to an open container at the front end of the conveyor 10.

The front end of the belt is located adjacent to a plenum chamber which directs a current of air past the end of the belt. The air stream is adjusted so that the leaves are carried away upwardly to be disposed of as waste while the beans fall off the end of the belt to be collected in a suitable manner as aforesaid.

Whilst the tines 15 may be rigidly attached to drum 14 and may themselves be nonresilient, they are preferably pivotably spring loaded and/or constructed of a resilient material so as to prevent damage thereto when the harvester is operating over uneven terrain.

It will be appreciated that it is not intended to limit the invention to the above example only, many variations being possible, such as might readily occur to one skilled in the art, without departing from the scope thereof.

Furthermore the harvester may be utilized for vegetables other than beans, it being suitable for peas, brussel sprouts and other vegetables which grow on the stems of leguminous plants.

What is claimed is:

1. A harvester for beans, peas, and similar vegetables which grow on the stems of leguminous plants, comprising; a frame means adapted for movement in a forward direction, endless belt means comprised of upper and lower runs mounted on said frame means, means for rotating said endless belt means in a direction so that said upper run moves in said forward direction while said lower run moves in a direction opposite to said forward direction for deflecting plants towards the rear of said frame means, drum means mounted on said frame means rearwardly of said endless belt means, said drum means having a plurality of tines around the periphery thereof, and means for rotating said drum means in a direction counter to direction of rotation of said endless belt means whereby said tines remove said vegetables from the stems of said plants which have been deflected rearwardly.

2. The harvester of claim 1 wherein the action of said rotating tines transfer said removed vegetables to said upper run of said endless belt means for removal.

3. The harvester of claim 2 wherein said runs of said endless belt means are inclined downwardly as they progress rearwardly.

4. The harvester of claim 3 wherein said endless belt means is positioned on two rollers, one being located behind the other, the forwardmost roller being positioned above the rearmost roller and each roller having a horizontal axis of rotation and said drum means having a horizontal axis of rotation.

5. The harvester of claim 4 wherein said forwardmost roller has a larger diameter than said rearmost roller, so that said belt means adopts a wedge shaped configuration.

6. The harvester of claim 5 wherein the tines are arranged to project from the drum in a plurality of rows, said rows being parallel to the axis of the drum.

7. The harvester of claim 6 wherein adjacent rows of tines are offset such that on rotation of the drum the gap between the tines in one row is swept out by one or more tines in another row or rows.

8. The harvester of claim 5 wherein the tines are arranged projecting radially of the drum in a random pattern.

Disclaimer 3,651,625.—*George Redford* and *Alan Redford*, Radcliffe, Lancashire, England. HARVESTER. Patent dated Mar. 28, 1972. Disclaimer filed Apr. 19, 1978, by the inventors.

Hereby enter this disclaimer to claim 1 of said patent.

[*Official Gazette July 4, 1978.*]